March 22, 1955  J. K. GAYLORD ET AL  2,704,798
CONTROL DEVICE RESPONSIVE TO ROTARY MOVEMENT
Filed Jan. 18, 1954
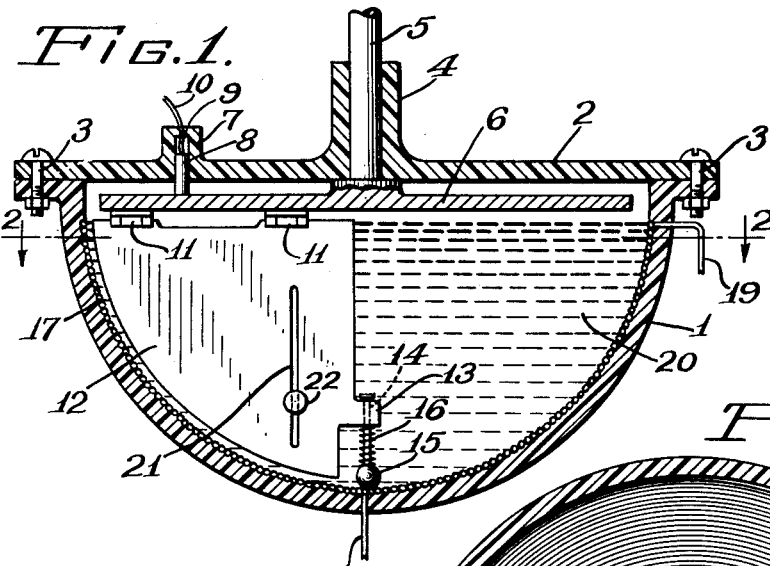
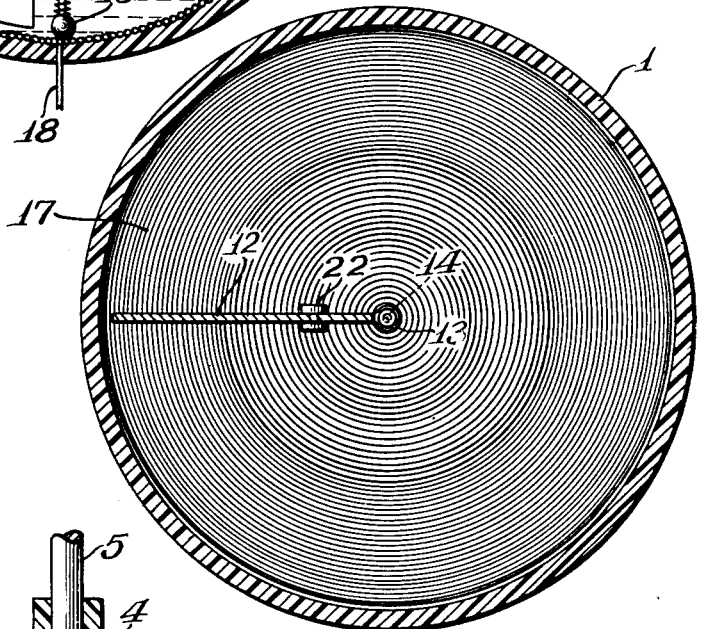
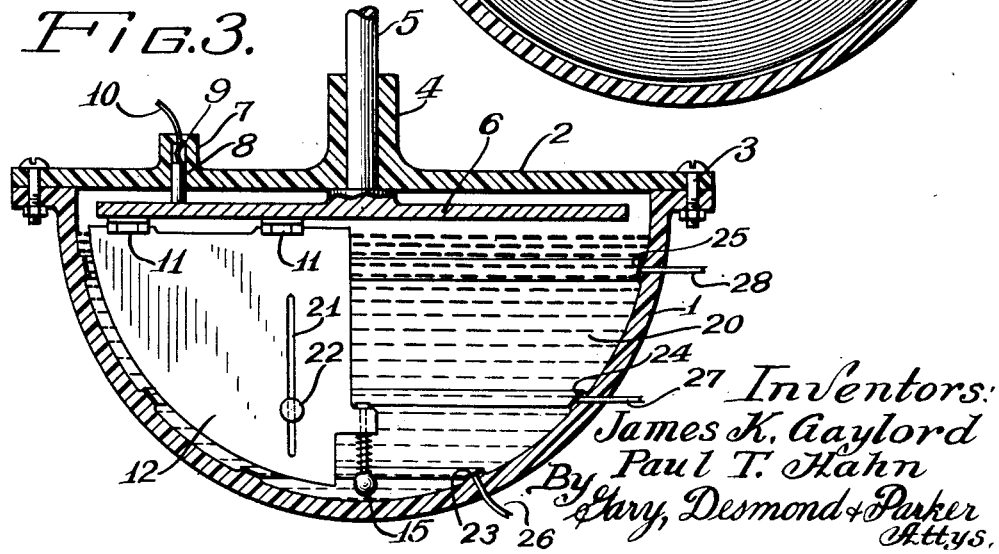
Inventors:
James K. Gaylord
Paul T. Hahn
By Hary, Desmond & Parker
Attys.

United States Patent Office 2,704,798
Patented Mar. 22, 1955

2,704,798

CONTROL DEVICE RESPONSIVE TO ROTARY MOVEMENT

James K. Gaylord and Paul T. Hahn, Chicago, Ill., assignors to Gaylord Products, Incorporated, Chicago, Ill., a corporation of Delaware Application January 18, 1954, Serial No. 404,514

7 Claims. (Cl. 201—48)

This invention relates to improvements in a speed responsive indicator or governor and refers particularly to a device for interpreting variations in rotary speed in terms of a proportional variation in flow of electric current.

In many instances it is desirable to control other apparatus in accordance with the rotary speed of a body. This control frequently is in the nature of a variation in the current supplied to the apparatus proportional to the rotary speed of the body.

The present invention is directed to an apparatus wherein changes in the rotary speed of a body may cause changes in current flowing in a resistance coil which latter may be included in the circuit of an apparatus whose operation is to be controlled.

Another use to which the invention may be put resides in the control of electric current to an electric meter which may be calibrated in terms of rotary speed whereby the variations in speed of a rotating body may be ascertained.

A further use to which the invention may be put resides in a control device which when driven at predetermined rotating speeds may function to pass predetermined currents or energize predetermined equipment or apparatus at said predetermined rotating speeds.

Other objects and advantages of the present invention will be apparent from the accompanying drawing and following detailed description.

In the drawing,

Fig. 1 is a sectional elevational view taken through the improved control device or indicator comprising the present invention.

Fig. 2 is a plan sectional view of the device taken on line 2—2 of Fig. 1.

Fig. 3 is a view similar to that of Fig. 1 illustrating a modification of the device.

Referring in detail to the drawing, 1 indicates a hemispherical container which is provided with an open mouth. A closure 2 is adapted to be positioned over the open mouth of the container and is secured thereto by means of bolts 3 or the like. The container 1 and closure 2 are preferably constructed of an insulating material such as hard rubber, plastic or the like.

An apertured boss 4 is carried by the closure 2 and is adapted to function as a bearing for a rotating shaft 5. The shaft 5 may be driven by a suitable prime mover or may be driven by a portion of an apparatus, the speed of which is adapted to be measured or used as a control for another apparatus or another operation. The shaft 5 within the container 1 carries a disc 6 which is constructed of metal, the disc being rotated by the shaft in a plane substantially parallel to the plane of the closure 2. A boss 7 is carried by the closure 2 in a position eccentric with respect to the shaft 5, said boss being provided with an aperture in which a brush or contact member 8 is adapted to be slidably positioned. A coil spring 9 bears upon the brush or contact member 8 and urges it into contact with the upper surface of the disc 6. An electrical conductor 10 connects with the brush or contact member 8 and may be connected to a suitable electric circuit (not shown) exterior of the container 1. By means of the brush or contact member 8 the disc 6 is thus connected to the conductor 10.

A pair of hinges 11 are positioned in radial spaced relationship upon the lower face of the disc 6 and a quadrant plate 12 is suspended upon said hinges. The quadrant plate 12 conforms substantially to the curvature of the inner surface of the container 1 and is spaced along its curved periphery from the inner curved surface of said container.

A lug 13 is formed upon one edge of the quadrant plate 12 and is provided with an aperture through which a pin 14 extends. The pin 14 at its lower end carries a contact ball 15 and a coil spring 16 embraces the shank of the pin 15, being confined between the ball 15 and the lower portion of the lug 13. The arrangement is such that the ball 15 is urged resiliently radially outwardly relative to the lug 13.

A coil of uninsulated wire 17 is positioned within the container 1 being disposed in spiral fashion adjacent the inner curved wall of said container. An electrical conductor 18 comprises one end of the coil 17 and a conductor 19 comprises the opposite end thereof. Both conductors 18 and 19 extend outwardly from the container and may be connected to an appropriate electrical circuit (not shown). In operation the ball 15 is urged into electrical contact with the coil 17 within the container 1. The container 1 carries a body of non-conducting fluid 20. The arrangement is such that when shaft 5 is rotated, plate 12 moves circularly within the container 1. The plate 12 during its rotary movement within the container encounters resistance offered by the fluid 20 and hence said plate is swung about the hinges 11. When the plate swings about hinges 11 the ball 15 makes contact with a portion of the coil 17 removed from the end thereof to which the conductor 18 is connected. Thus, an electrical circuit will be completed from conductor 10, conductor 18 and conductor 19 which, depending upon the speed of rotation of shaft 5 includes a predetermined resistance between conductor 10 and conductor 19. The coil 17 may be connected to an external circuit in the form of a potentiometer in which case an electrical circuit will be established between conductor 10 and conductor 18 through a predetermined portion of coil 17 and between conductor 10 and conductor 19 through the remaining portion of the coil 17. If desired, however, the coil 17 may be connected as a simple rheostat in which case only conductor 18 or conductor 19 may be connected in the effective electrical current.

The swinging of plate 12 about hinges 11 is a function of the rotary speed of shaft 5, the weight of plate 12 and the viscosity of the fluid 20. For a predetermined weight of the plate 12 and a predetermined viscosity of fluid 20, the swinging of plate 12 will be a function of the rotary speed of shaft 5. For a predetermined rotary speed of shaft 5 the angle through which the plate 12 will swing about hinges 11 will be proportional to the weight of the plate 12, the viscosity of the fluid 20 remaining constant. If the weight of the plate 12 is increased, the speed of the shaft 5 can be increased for a given angular swing of the plate 12. If the weight of the plate 12 is decreased, the speed of rotation of shaft 5 can be decreased for a predetermined angular swing of the plate 12. Similarly for a predetermined rate of rotation of shaft 5 and a predetermined rate of plate 12, the plate will swing through a greater angle as the viscosity of the fluid 20 is increased and vice versa will swing through a lesser angle if the viscosity of the fluid 20 is decreased.

To permit variation of the weight of plate 12 an elongated slot 21 is provided in said plate and an adjustable weight 22 is positioned in said slot, said weight being movable upwardly or downwardly in the slot 21. The downward movement of the weight 22 in the slot 21 has the effect of increasing the weight of the plate 12, that is, the effective weight of plate 12 is increased as the moment arm between hinges 11 and weight 22 is increased and the effective weight of the plate 12 will be decreased as the moment arm between hinges 11 and weight 22 is decreased. Thus, the device can be calibrated either by changing the effective weight of the plate 12 or by changing the viscosity of the fluid 20 or both.

In utilizing the device comprising the present invention the circuit comprising conductors 10, 18 and 19 may be employed as a control circuit for an extraneous piece of apparatus (not shown) wherein certain operations will be performed by said extraneous apparatus as the current varies through the circuit or circuits comprising the coil 17. If desired, the coil 17 may be appropriately connected in series with an electric meter (not shown) which may be calibrated in terms of rotary speed. In this use of the device, the meter may be employed to determine or indicate the rotary speed of shaft 5. It will be readily apparent to those skilled in the art that the device may be employed in numerous environments and may be utilized as an indicator or control device in conjunction with extraneous apparatus.

Referring particularly to Fig. 3, a modification of the invention is shown. In this form of the invention substantially all of the physical apparatus hereinbefore described remains the same with the exception that the coil 17 is eliminated and in lieu thereof a plurality of spaced conducting rings 23, 24 and 25 are employed. Without further description, the parts of the apparatus shown in Fig. 3 which are similar to those hereinbefore described will be designated with corresponding reference numerals.

The rings 23, 24 and 25 are coaxial and are spaced circularly from each other along the inner face of the container 1. Ring 23 may be connected by means of conductor 26 to an external electric circuit (not shown), ring 24 may be connected to an external circuit by means of conductor 27 and ring 25 may be connected to an external circuit by means of a conductor 28. With a predetermined effective weight of plate 12 and with a fluid 20 of predetermined viscosity the ball 15 will progressively contact rings 23, 24 and 25 as the speed of shaft 5 is increased due to the resistance encountered by the plate 12 in the body of fluid 20.

In use, the rings 23, 24 and 25 may be connected to extraneous apparatus (not shown) which it may be desired to operate at different speeds of a shaft 5. For instance, if shaft 5 is rotated at a predetermined speed, it may be desired to operate a predetermined extraneous apparatus which may be connected to the conductor 26. Thus, an electrical circuit will be completed from conductor 10 to conductor 26. Further, it may be desired to operate another piece of apparatus when the shaft 5 increases its speed to a speed above said predetermined speed. With an increase of speed the ball 15 may contact ring 24 and thus a circuit will be completed between conductor 10 and conductor 27. Similarly, as the speed of shaft 5 is increased, the plate 12 may be so swung as to complete an electrical circuit between conductor 10 and conductor 28 and thus operate a third piece of apparatus. Of course, the conductors 26, 27 and 28 may be connected to the same extraneous piece of apparatus which may perform different operations when each of said conductors are brought into circuit with the conductor 10. It can readily be seen that the form of the invention illustrated in Fig. 3 may be employed in substantially the same environment as the form of the invention illustrated in Figs. 1 and 2 merely by connecting conductors 26, 27 and 28 to spaced portions of an external resistance coil. In the case of the device shown in Fig. 3, the varying current passed through the extraneous coil may be changed in stepwise fashion as opposed to the substantially infinite variation which can be secured when the coil 17 is employed.

It can readily be seen that herein is provided an apparatus which relies essentially for its functioning upon the swinging of a hinged plate within a container carrying a body of non-conductive fluid, the plate comprising a portion of an electrical circuit which may change the intensity or amount of electric current in a predetermined relationship to the speed of rotation of the shaft which drives the plate. In view of the many environments in which the device comprising the present invention may be employed it is not intended that the examples of use hereinbefore described be considered a limitation of the invention.

We claim as our invention:

1. A rotary speed responsive electric control device which comprises, a substantially hemispherical shell container, an electrical conductor disposed upon the inner surface of said container between the base of the shell and the portion of greatest diameter of the shell, said container being adapted to carry a body of non-conductive fluid, rotatable means positioned in said container, a plate hingedly connected to said rotatable means and suspended in said fluid, an electrical contact carried by said plate for making contact with said conductor in said container as said plate is circularly carried by said rotatable means through said fluid and is frictionally acted upon by said fluid to swing said plate about its hinged connection, and means for connecting said plate and said conductor to an electrical circuit.

2. A rotary speed responsive electric control device which comprises, a substantially hemispherical shell container, a plurality of electrical conductors disposed upon the inner surface of said container between the base of the shell and the portion of greatest diameter of the shell, said container being adapted to carry a body of non-conductive fluid, rotatable means positioned in said container, a plate hingedly connected to said rotatable means and suspended in said fluid, an electrical contact carried by said plate for making contact with a predetermined conductor in said container as said plate is circularly carried by said rotatable means through said fluid, and is frictionally acted upon by said fluid to swing said plate about its hinged connection, and means for connecting said plate and said conductors to an electrical circuit.

3. A rotary speed responsive electric control device which comprises, a substantially hemispherical shell container, a plurality of electrical conductors substantially circularly disposed upon the inner surface of said container between the base of the shell and the portion of greatest diameter of the shell, said container being adapted to carry a body of non-conductive fluid, rotatable means positioned in said container, a plate hingedly connected to said rotatable means and suspended in said fluid, an electrical contact carried by said plate for making contact with a predetermined conductor in said container as said plate is circularly carried by said rotatable means through said fluid, and is frictionally acted upon by said fluid to swing said plate about its hinged connection, and means for connecting said plate and said conductors to an electrical circuit.

4. A rotary speed responsive electric control device which comprises, a substantially hemispherical shell container, a plurality of electrical conductors disposed upon the inner surface of said container, and spaced from each other from the base of the shell and the portion thereof of greatest diameter, said container being adapted to carry a body of non-conductive fluid, rotatable means positioned in said container, a plate hingedly connected to said rotatable means and suspended in said fluid, an electrical contact carried by said plate opposite said hinged connection for making contact with a predetermined conductor in said container as said plate is circularly carried by said rotatable means through said fluid and is frictionally acted upon by said fluid to swing said plate about its hinged connection, and means for connecting said plate and said conductors to an electrical circuit.

5. A rotary speed responsive electric control device which comprises, a substantially hemispherical shell container, a plurality of electrical conductors disposed upon the inner surface of said container, and spaced from each other from the base of the shell and the portion thereof of greatest diameter, said container being adapted to carry a body of non-conductive fluid, rotatable means positioned in said container, a plate hingedly connected to said rotatable means and suspended in said fluid, an electrical contact carried by said plate opposite said hinged connection for making contact with a predetermined conductor in said container as said plate is circularly carried by said rotatable means through said fluid and is frictionally acted upon by said fluid to swing said plate about its hinged connection, a weight adjustably movable upon said plate between said contact and said hinged connection to change the swinging response of said plate during its passage through said fluid, and means for connecting said plate and said conductors to an electrical circuit.

6. A rotary speed responsive electric control device which comprises, a substantially hemispherical shell container, a plurality of interconnected electrical resistance wires disposed in the form of a coil upon the inner surface of said container with the individual loops of the coil disposed in planes substantially parallel to the greatest diameter of the shell, said container being adapted to carry a body of non-conductive fluid, rotatable means positioned in said container for rotation in a plane substantially parallel to the loops of the coil, a plate hingedly connected to said rotatable means and suspended in said fluid, an electrical contact carried by said plate spaced from its hinged connection for making contact with a predetermined portion of said coil in said container as said plate is circularly carried by said rotatable means through said fluid and is frictionally acted upon by said fluid to swing said plate about its hinged connection, and means for connecting said plate and said coil to an electrical circuit.

7. A rotary speed responsive electric control device which comprises, a substantially hemispherical shell container, a plurality of spaced electrical conductor rings disposed upon the inner surface of said container with the plane of said rings substantially parallel to the plane of the greatest diameter of the shell, said container being adapted to carry a body of non-conductive fluid, rotatable means positioned in said container, a plate hingedly connected to said rotatable means and suspended in said fluid, an electrical contact carried by said plate for making contact with a predetermined ring in said container as said plate is circularly carried by said rotatable means through said fluid and is frictionally acted upon by said fluid to swing said plate about its hinged connection, and means for connecting said plate and said rings to an electrical circuit.

No references cited.